No. 639,573. Patented Dec. 19, 1899.
H. N. HOBART.
GATE.
(Application filed Oct. 2, 1899.)
(No Model.)
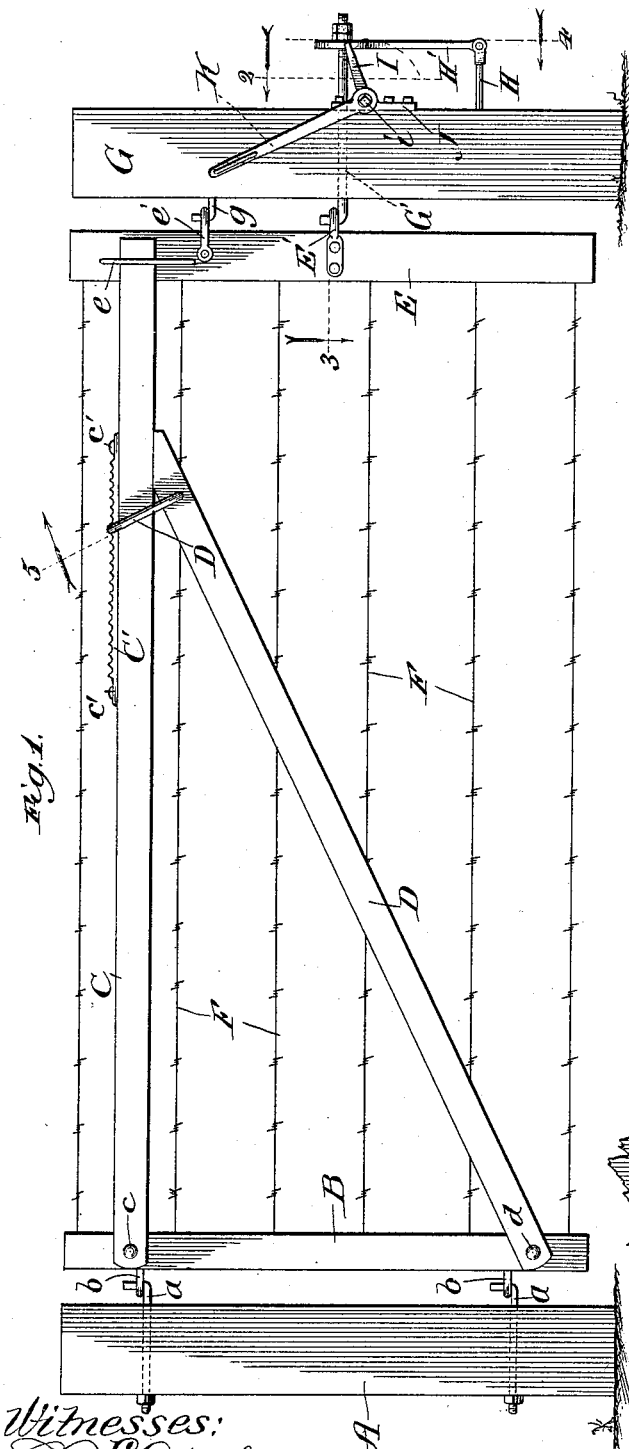
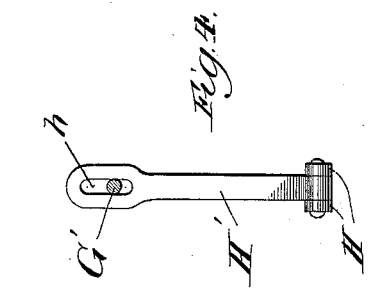
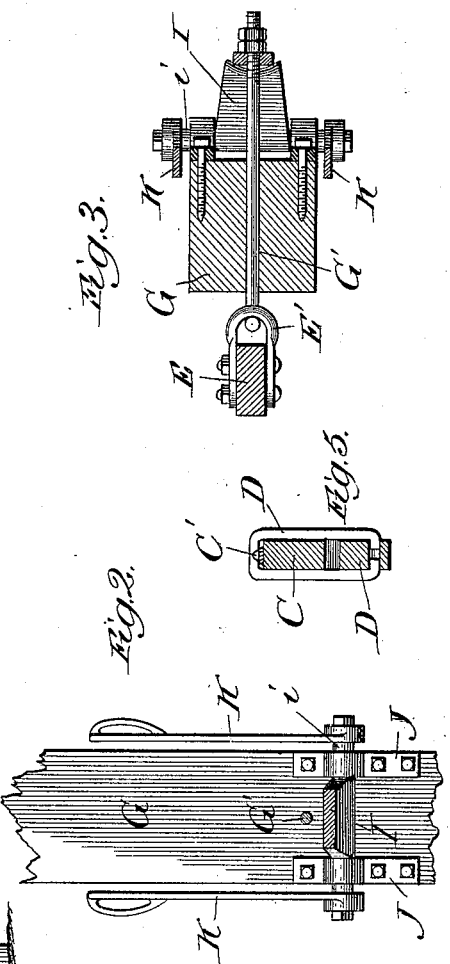
Witnesses:
Inventor:
Horatio N. Hobart,

UNITED STATES PATENT OFFICE.

HORATIO N. HOBART, OF ELGIN, ILLINOIS, ASSIGNOR OF ONE-HALF TO RICHARD N. BOTSFORD, OF SAME PLACE.

GATE.

SPECIFICATION forming part of Letters Patent No. 639,573, dated December 19, 1899.

Application filed October 2, 1899. Serial No. 732,366. (No model.)

*To all whom it may concern:*

Be it known that I, HORATIO N. HOBART, a citizen of the United States, residing at Elgin, Illinois, have invented certain new and useful Improvements in Gates, of which the following is a specification.

The invention relates to farm and lawn gates and fastenings therefor.

The object of the invention is to provide a gate of barb or woven wire which will form a part of a barb or woven wire fence as little distinguished as possible from the remainder of the fence; and the invention consists in the features and details of construction hereinafter described and claimed.

In the drawings, Figure 1 is a side elevation of my improved barb or woven wire fence gate; Fig. 2, a rear elevation, partly in section, of the gate-post and the locking mechanism, taken in the line 2 of Fig. 1. Fig. 3 is a plan sectional view taken in the line 3 of Fig. 1. Fig. 4 is a rear elevation of a part, taken in the line 4 of Fig. 1; and Fig. 5 is a sectional view taken in the line 5 of Fig. 1.

In making my improved barb or woven wire fence gate and fastener I insert in a post A hook-rods $a$, which pass through the post and are held at their rear ends by nuts or in any other desired way. I provide the rear vertical bar of the gate B with eye-rods $b$, whose eyes engage the hooks of the rods A. To this rear vertical bar I pivot a forwardly-extending horizontal bar C by means of a bolt or pivot $c$, so that it can be swung in a vertical plane on its pivot. This upper horizontal bar is carried forward a sufficient distance, determined by the width of the gate. I arrange on top of the horizontal bar a rack C', that may be made of any desired length and fastened by screws or bolts $c'$, passing through its ends into the horizontal bar. To brace and support the upper horizontal bar of the gate, I provide a brace-bar D, pivoted to the rear vertical bar of the gate on a bolt or pivot $d$, so that it can be moved up or down in a vertical plane. The forward end of this brace-bar is placed under the forward portion of the upper horizontal bar, and it is provided with a link D', which embraces the horizontal bar and has its upper portion received in the notches of the rack. When it is desired to move or raise the horizontal bar into an upright or substantially upright position, the link is loosened from the notches of the rack by moving its upper end forward, when the horizontal bar and brace-bar may be freely raised into a vertical or substantially vertical position, the horizontal bar sliding through the link. When, however, such bar is lowered, its front end is held by the brace-bar and link from passing below a horizontal position. The front vertical bar E of the gate is provided with a wide staple $e$, which is intended to receive the front end of the horizontal bar, so that the front vertical bar can slide freely thereon. Strands of barb or woven wire F connect the rear and front vertical bars of the gate, so as to make the gate a panel or continuation of the fence.

The front vertical bar of the gate is provided with eyepieces E' and $e'$ to permit of its being properly fastened or locked to a gate-post G, arranged in proper position or relation to the front vertical bar of the gate.
This post has a hook-rod $g$ driven or fastened in its face opposite the gate to receive the eye of the piece $e'$, and a hook-rod G', with its hook in position to receive the eye of the piece E'. The hook-rod G' passes back through a hole in the gate-post and extends a desired distance to the rear of the same. As shown in Fig. 1, this rear end is screw-threaded, so as to receive a nut. I fasten a rod H to the rear of the gate-post a desired distance below the rod G' and pivotally attach to the end of this rod a vertical tongue H'. This vertical tongue is provided with a vertical slot $h$ at its upper end, adapted to pass over the rearwardly-projecting end of the hook-rod G'. After being so passed over the end of the rod one or more nuts are screwed onto the end of the rod, forming a stop and preventing the withdrawal of the end of the hook-rod. I make a cam-piece I, provided with projecting ends $i$, adapted to protrude beyond each side of the gate-post, as shown in Figs. 2 and 3. This cam-piece is arranged in position below the hook-rod by means of bracket-pieces J, which embrace the projecting ends of the cam-piece and which are fastened to the gate-post by nails or spikes or in any other desired way, so as to hold the cam-piece in place and permit it to turn in the bracket-pieces. The projecting ends of the cam-piece are made square or angular at their ends, so as to receive levers K, which are arranged at each side of the gate-post, as shown in Figs. 2 and 3. By oscillating these levers the cam-piece can be turned and its free end raised or lowered within the limits of its movements.

As shown in Fig. 1 the gate is in its locked or fastened position. To unlock it, the lever is turned over in its opposite position or away from the gate. This causes the free end of the cam-piece to be moved through the arc indicated by the dotted lines in Fig. 1, so that it no longer impinges upon or bears against the pivoted vertical piece H'. This leaves the hook-rod G' free to be moved, so as to relax the engagement between this hook and the eyepiece E'. The gate can then be lifted off of the hook on the rod g and opened. If a snow-drift or other obstruction be in the way, the vertical front bar of the gate can be slid back on the horizontal rod, or by loosening the link D' the horizontal bar can be turned upward and the front vertical bar of the gate and the strands of wire carried with it, so that they may be carried over such obstruction.

When it is desired to close and lock the gate, the eyepiece e' is placed over the hook of the rod g and the hook of the rod G' is placed through the eye of the piece E'. The levers K are then turned into the position shown in Fig. 1, which causes the free end of the cam-piece I to bear against the vertical pivoted piece H' and force it to its extreme out position. This draws the hook-rod G' back with it, so as to tighten the engagement between the eyepiece E' and its hook to such an extent that the one cannot be lifted from the other until the tension is released by throwing the levers back and the free end of the cam-piece down.

What I regard as new, and desire to secure by Letters Patent, is—

1. In a barb or woven wire fence gate, the combination of a front vertical bar, a rear vertical bar, an upper horizontal bar connected to the front vertical bar by means which permit the front vertical bar to slide on the horizontal bar, an inclined brace-rod pivoted at its rear end to the rear vertical bar near its bottom, and a link for connecting its front end to the horizontal bar to permit the horizontal bar to slide therethrough as it is raised toward a vertical position, substantially as described.

2. In a barb or woven wire fence gate, the combination of a front vertical bar, a rear vertical bar, an upper horizontal bar connected to the front vertical bar by means which permit the front vertical bar to slide on the horizontal bar, a rack on the top of the horizontal bar, an inclined brace-rod pivoted at its rear end to the rear vertical bar near its bottom, and a link for connecting its front to the horizontal bar through engagement with the teeth of the rack and which when disengaged from the teeth of the rack permits the horizontal bar to slide therethrough as it is raised toward a vertical position, substantially as described.

3. In a barb or woven wire fence gate, the combination of a front vertical bar, horizontal strands of barbed or woven wire, a latch-post, an eyepiece extending out from the front vertical bar, a hook-rod passing through the post with its hook adapted to engage the eyepiece, a fixed rod extending to the rear of the post, a vertical rod pivoted at its lower end to the fixed rod and provided at its upper end with an enlarged hole through which the rear end of the hook-rod passes, a nut or stop on the rear end of the hook-rod to prevent the disengagement therefrom of the vertical rod, and means for forcing the upper end of the vertical rod back and thereby moving the front vertical bar of the gate toward the post, substantially as described.

4. In a barb or woven wire fence gate, the combination of a front vertical bar, horizontal strands of barbed or woven wire, a latch-post, an eyepiece extending out from the front vertical bar, a hook-rod passing through the post with its hook adapted to engage the eyepiece, a fixed rod extending to the rear of the post, a vertical rod pivoted at its lower end to the fixed rod and provided at its upper end with an enlarged hole through which the rear end of the hook-rod passes, a nut or stop on the rear end of the hook-rod to prevent the disengagement therefrom of the vertical rod, a cam for forcing the upper end of the vertical rod back and thereby moving the front vertical bar of the gate toward the post, and levers for operating the cam, substantially as described.

HORATIO N. HOBART.

Witnesses:
THOMAS A. BANNING,
THOMAS B. MCGREGOR.